(12) United States Patent
Espin et al.

(10) Patent No.: US 6,513,592 B2
(45) Date of Patent: Feb. 4, 2003

(54) METHOD FOR CONSOLIDATION OF SAND FORMATIONS USING NANOPARTICLES

(75) Inventors: Douglas Espin, Caracas (VE); Juan Carlos Chavez, La Sierra Torret (VE); Aaron Ranson, Edo Miranda (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 09/796,255

(22) Filed: Feb. 28, 2001

(65) Prior Publication Data

US 2002/0117302 A1 Aug. 29, 2002

(51) Int. Cl.⁷ .............................................. E21B 33/138
(52) U.S. Cl. ...................... 166/295; 166/294; 166/300; 405/264; 507/234; 507/269; 428/405; 523/131
(58) Field of Search ................................ 166/276, 292, 166/294, 295, 300; 106/900; 405/263, 264; 428/404, 405, 407; 507/233, 234, 269; 523/130, 131, 132

(56) References Cited

U.S. PATENT DOCUMENTS

| | | | | |
|---|---|---|---|---|
| 3,121,698 A | * | 2/1964 | Orsino et al. ................ | 264/317 |
| 4,521,317 A | * | 6/1985 | Candau et al. ............... | 166/275 |
| 4,732,213 A | * | 3/1988 | Bennett et al. .............. | 166/275 |
| 4,875,809 A | * | 10/1989 | Csajtai et al. ............ | 166/305.1 |
| 6,177,483 B1 | * | 1/2001 | Tehrani et al. .............. | 166/294 |
| 6,206,102 B1 | * | 3/2001 | Pusch et al. ................. | 166/295 |
| 6,250,848 B1 | * | 6/2001 | Moridis et al. ............. | 166/292 |
| 6,287,639 B1 | * | 9/2001 | Schmidt et al. ............. | 427/387 |

FOREIGN PATENT DOCUMENTS

| | | |
|---|---|---|
| GB | 1 453 001 | 10/1976 |
| GB | 2 161 492 | 1/1986 |

OTHER PUBLICATIONS

WPI Abstract Accession No. 2001–221037 & JP 2001019957 (Mitsubishi Rayon Co) Jan. 23, 2001.
WPI Abstract Accession No. 1995–273083 & JP 7173469 (Chichibu Onada Cement Corp) Jul. 11, 1995.
WPI Abstract Accession No. 1994–211011 & JP 6145662 (Nippon Chemical Ind) May 27, 1994.

* cited by examiner

*Primary Examiner*—George Suchfield
(74) *Attorney, Agent, or Firm*—Bachman & LaPointe, P.C.

(57) ABSTRACT

A method is disclosed for consolidating an unconsolidated formation, which method includes the steps of providing a well drilled to an unconsolidated formation, providing a consolidation fluid in the form of a fluid suspension of nanoparticles, and flowing said consolidation fluid through the well and into the unconsolidated formation so as to position the nanoparticles between grains of the unconsolidated formation whereby the formation is consolidated over time.

14 Claims, 2 Drawing Sheets

METHOD FOR CONSOLIDATION OF SAND FORMATIONS USING NANOPARTICLES

BACKGROUND OF THE INVENTION

The invention relates to a method for consolidating unconsolidated formations.

In the production of hydrocarbons from subterranean formations, unconsolidated formations are frequently encountered. Such formations must be consolidated in order to proceed with production of hydrocarbons from this formation, or particulate matter can enter the well.

If an unconsolidated formation is left unconsolidated, the flow of hydrocarbon and other subterranean fluids into a well will drag grains of sand and other debris from the formation into the well resulting in such debris being produced through various equipment. This debris is harmful and damaging to the equipment, and undesirable in the end product.

Currently, in order to address such problems, organic compounds and/or resins are disposed into the formation in a three-stage process. First, the resin is injected. Second, an activation system is injected for activating the resin. Third, a system must be injected for controlling permeability and dislodging excess resin.

The three-stage process itself is cumbersome and difficult to manage. In addition, the excess dislodging agents are difficult to control in order to avoid one of two extreme possible conditions, that is, high or low reactivity. High reactivity is undesirable in that weakness of consolidation can result, while low reactivity is undesirable in that the original formation permeability can be significantly reduced.

The three-system process also is disadvantageous in that management of more than one fluid during the process is required. This can cause difficulty in maintaining the sweeping efficiency of each fluid through the porous media. Further, these limitations are exacerbated in thick formations, and also in horizontal sections, where it is important to be sure that each subsequent fluid has the same sweep as the preceding fluid. Otherwise, some sections will not be treated to maintain permeability while other sections are not consolidated at all.

In light of the foregoing, it is clear that the need remains for a method for consolidating unconsolidated formations such as sand and the like.

It is therefore the primary object of the present invention to provide a method for consolidating unconsolidated formations.

It is a further object of the present invention to provide such a method wherein the steps required for completing consolidation are reduced.

Other objects and advantages of the present invention will appear hereinbelow.

SUMMARY OF THE INVENTION

In accordance with the present invention the foregoing objects and advantages have been readily attained.

According to the invention, a method for consolidating an unconsolidated formation is provided, which method comprises the steps of providing a well drilled to an unconsolidated formation; providing a consolidation fluid comprising a fluid suspension of nanoparticles; and flowing said consolidation fluid through said well and into said unconsolidated formation such that said nanoparticles establish stable bridges (bonds) between contacting grains of said unconsolidated formation.

BRIEF DESCRIPTION OF THE DRAWINGS

A detailed description of preferred embodiments of the present invention follows, with reference to the attached drawings, wherein.

DETAILED DESCRIPTION

The invention relates to a method for consolidating an unconsolidated formation.

Unconsolidated formations may frequently be encountered during the drilling for and production of subterranean hydrocarbon resources. One type of frequently encountered unconsolidated formation is a sand formation, which can frequently bear large amounts of hydrocarbon. These formations can pose problems due to free sand being produced through production equipment and pipes.

In accordance with the present invention, unconsolidated formations are consolidated by disposing a fluid comprising nanoparticles into the formation and forming stable bridges or bonds between the contacting sand grains of the formation, so as to increase the strength of the formation sufficiently that drag forces of hydrocarbon fluids flowing into the well do not dislodge the sand particles and particulate flow in the well is eliminated or substantially reduced.

Figure 1:
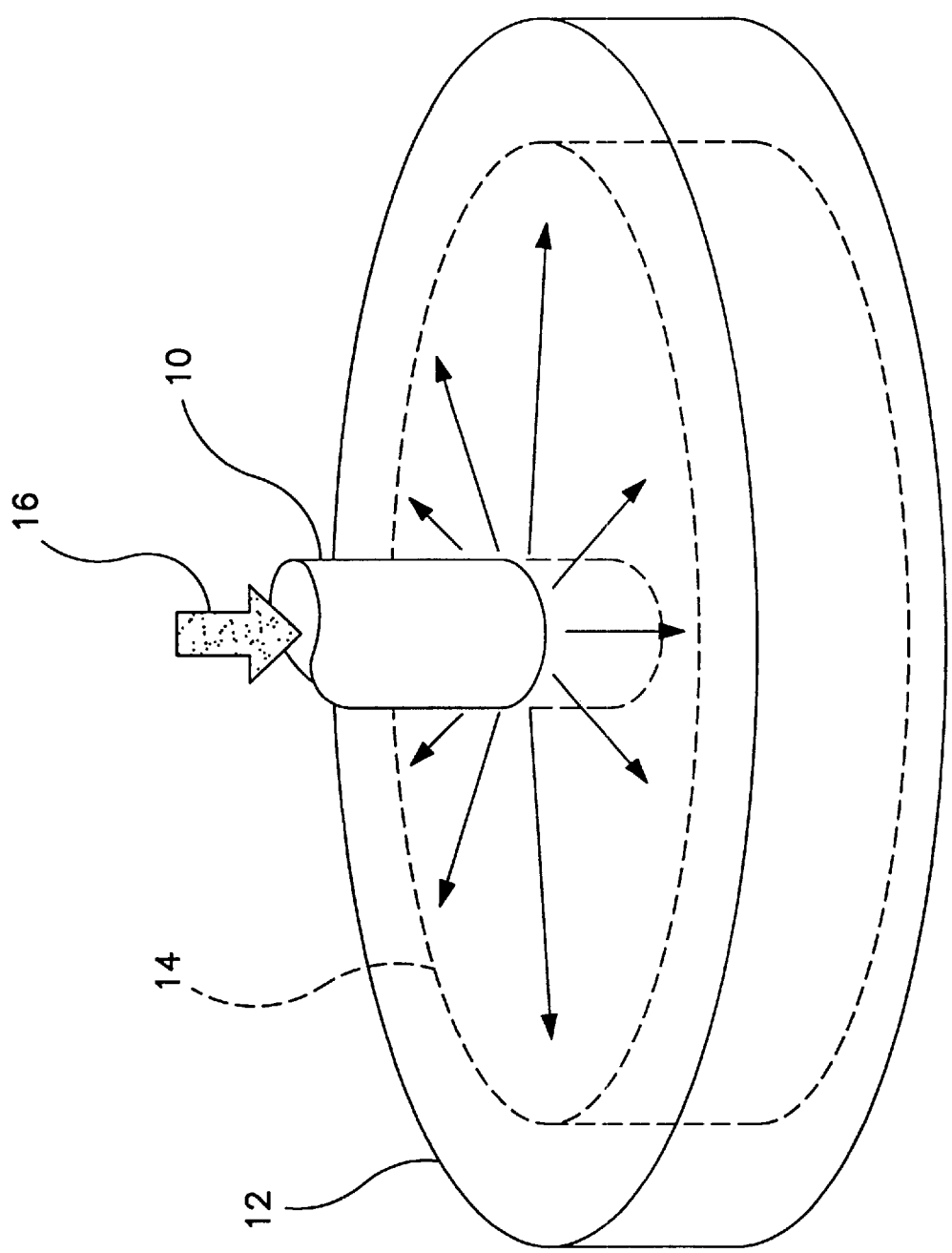
FIG. 1 schematically illustrates the method of the present invention.

Referring to FIG. 1, the method for consolidating unconsolidated formations is schematically illustrated. FIG. 1 shows a well 10 disposed into and through an unconsolidated formation 12. Due to formation pressure, or alternatively artifical lift, well 10 can be used for production of hydrocarbons from formation 12 into well 10 and to the surface as is well known.

In accordance with the method of the present invention, a displacement fluid is injected through well 10 and into formation 12 so as to displace formation fluid such as hydrocarbons, formation water and the like away from well 10 and further into formation 12. The fluid front 14 established by such injection is schematically shown in FIG. 1. Following injection of the displacement fluid, a consolidation system 16 is then injected. In accordance with the present invention, the consolidation system 16 is a fluid suspension of nanoparticles, preferably an aqueous suspension of nanoparticles as will be more thoroughly discussed below.

During this injection, nanoparticles lodge between loose grains of the unconsolidated formation. Consolidation occurs over time, and can be expedited as described below, wherein the nanoparticles form a bond of sufficient strength with adjacent contacting grains of sand that the Young's Modulus of the formation is substantially increased, for example to values of greater than or equal to about $1 \times 10^6$ psi. This is a substantial improvement as compared to untreated unconsolidated formations which can frequently have a Young's Modulus of less than or equal to about $0.4 \times 10^6$ psi.

In accordance with the present invention, the displacement system or fluid may suitably be water or any other suitable fluid which has appropriate characteristics for displacing formation fluids away from the well. Water is particularly desirable since the viscosity of water is sufficiently low that pumping is not a problem. Of course, other fluids could be used for displacing fluid well within the scope of the present invention.

The nanoparticles of the present invention are provided having an average particle size of between about 1 nanometer ($10^{-9}$ m) (nm) and about 200 nanometers ($10^{-9}$ m) (nm). The nanoparticles are formed of molecules of organic and inorganic components. The inorganic component has an affinity for the sand grains of the formation. Thus, $SiO_2$, for example, is suitable as the inorganic compound, particularly, silica and/or quartz. The organic component allows for polymerization bonding of the inorganic component to the contacting sand grains of the formation under certain pH conditions as explained hereinbelow. Suitable organic components include, for example, silanes, hydroxyls and/or alkaloids. Suitable nanoparticle materials for use in the method of the present invention include those disclosed in PCT/EP97/06370 published May 28, 1998.

After treatment of the formation with the displacing fluid as discussed above, a fluid suspension of the nanoparticles is prepared for injection into the formation by adding the nanoparticles to, preferably, a substantially neutral or mildly acidic fluid. The polymerization bonding of the nanoparticles described above is substantially nil under acidic conditions. Once the fluid suspension of nanoparticles is injected into the formation, the bonding process will take place over time at a neutral pH environment. Pressure is preferably held within well 10 so as to prevent formation fluids from flowing back into the well until the bonding has been sufficiently completed. The bonding and curing process can be accelerated by injecting water after the consolidation fluid. Further acceleration is obtained by altering the pH of the system to basic.

Following bonding and curing, the well is then opened to production, and the initial flow of production fluid displaces any remaining bonding agent.

Figure 2:
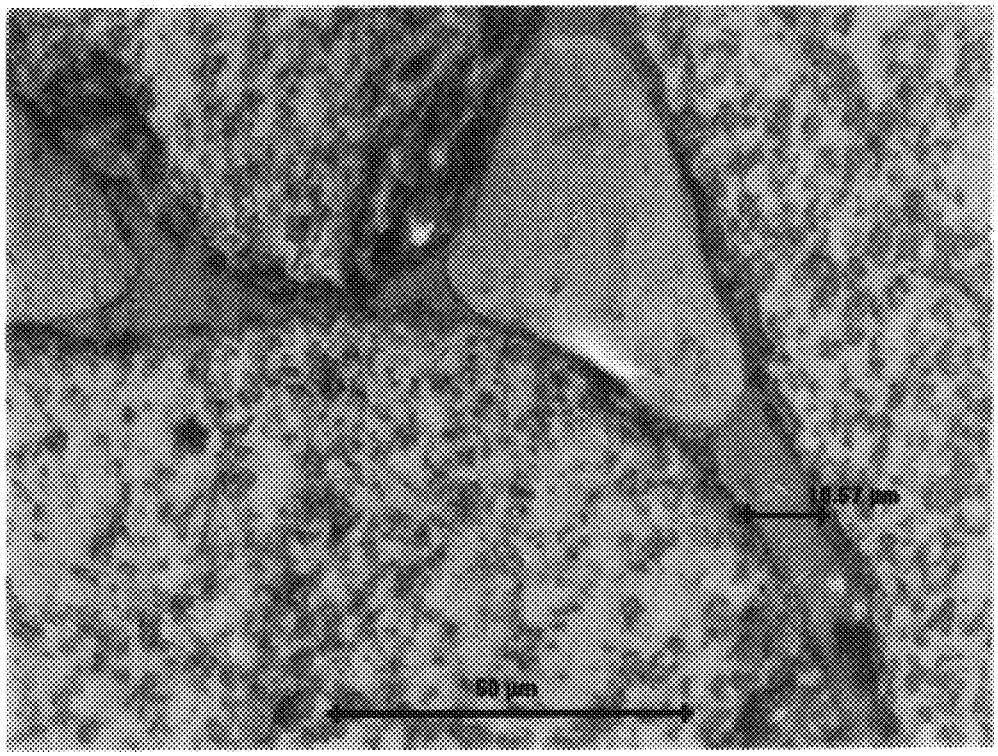
FIG. 2 is a photomicrograph showing the bonding mechanism of nanoparticles in accordance with the present invention.

In accordance with the present invention, and as shown in FIG. 2, the nanoparticles have been found to locate themselves at contact points between the grains of unconsolidated formation during the injection step. The foregoing is helped by capillary forces. It has been found that the nanoparticles can greatly enhance formation strength without sufficiently impacting in an adverse manner upon the permeability and porosity of same.

Thus, in accordance with the method of the present invention, unconsolidated formations are strengthened and consolidated without adversely impacting upon formation permeability and porosity.

It should be readily appreciated that a method has been provided whereby unconsolidated formations such as sand formations and the like are strengthened and consolidated in a simple and effective process which is a substantial improvement over the processes of the prior art.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for consolidating an unconsolidated formation containing sand, comprising the steps of:

providing a well drilled to an unconsolidated formation;

providing a substantially non-acidic consolidation fluid comprising a fluid suspension of nanoparticles comprising an inorganic component having an affinity for the sand grains of the formation and an organic component which allows for polymerization bonding of the inorganic component to contacting sand grains of the unconsolidated formation under substantially non-acidic conditions, wherein said nanoparticles have an average particle size between about 1 and about 200 nm; and flowing said consolidation fluid through said well and into said unconsolidated formation so as to contact said nanoparticles with the grains of said unconsolidated formation.

2. The method according to claim 1, further comprising the steps of, before said flowing step, flushiing said unconsolidated formation with a displacing fluid so as to displace formation fluids further into said unconsolidated formation and away from said well.

3. The method according to claim 2, wherein said displacing fluid is water.

4. The method according to claim 1, wherein said consolidation fluid comprises an aqueous suspension of nanoparticles.

5. The method according to claim 1, wherein said aqueous suspension has a substantially neutral pH.

6. The method according to claim 1, further comprising the steps of, after said flowing step, producing formation fluids from said formation through said well whereby a liquid portion of said consolidation fluid is removed from said formation and said nanoparticles remain in said formation.

7. The method according to claim 1, wherein said flowing step creates a consolidated zone in said unconsolidated formation in an area surrounding said well.

8. The method according to claim 1, further comprising the step of holding pressure in said well so as to allow a bond between said nanoparticles and particles of said formation to cure.

9. The method according to claim 1, further comprising the step of following said consolidation fluid with a curing fluid so as to accelerate the bonding between said nanoparticles and particles of said formation.

10. The method according to claim 9, wherein the curing fluid is water.

11. The method according to claim 9, wherein the curing fluid has a basic pH.

12. The method according to claim 1, wherein said unconsolidated formation has a Young's Modulus of less than or equal to about $0.4 \times 10^6$ psi, and wherein said nanoparticles form a consolidated zone having a Young's Modulus of greater than or equal to about $1.0 \times 10^6$ psi.

13. The method according to claim 1, wherein said unconsolidated formation is a sand formation.

14. A method for consolidating an unconsolidated formation, comprising the steps of:

providing a well drilled to an unconsolidated formation;

providing a consolidation fluid comprising a fluid suspension of nanoparticles;

flowing said consolidation fluid through said well and into said unconsolidated formation so as to contact said nanoparticles with the grains of said unconsolidated formation; and following said consolidation fluid with a curing fluid so as to accelerate the bonding between said nanoparticles and particles of said formation.

* * * * *